Aug. 2, 1966 W. E. GRUNWALD 3,263,505
PNEUMATIC ACCELEROMETER
Filed May 26, 1964
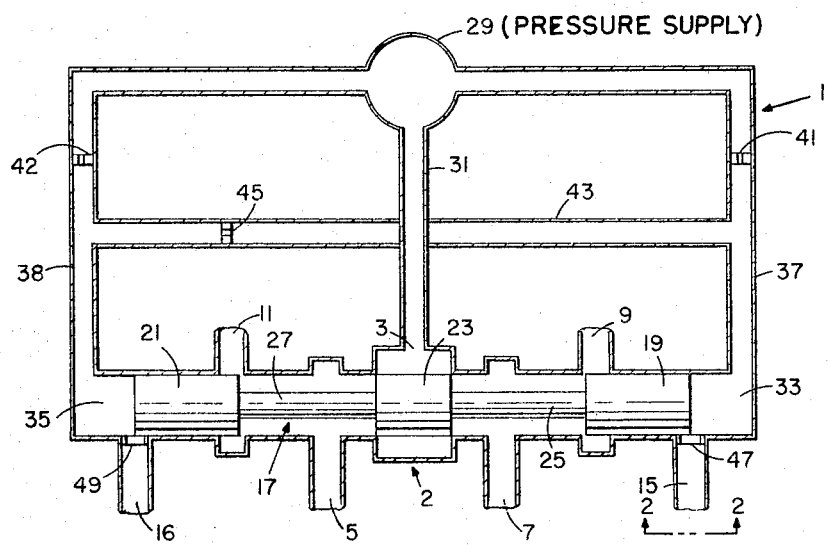
FIG. I
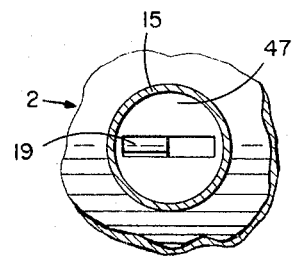
FIG. 2
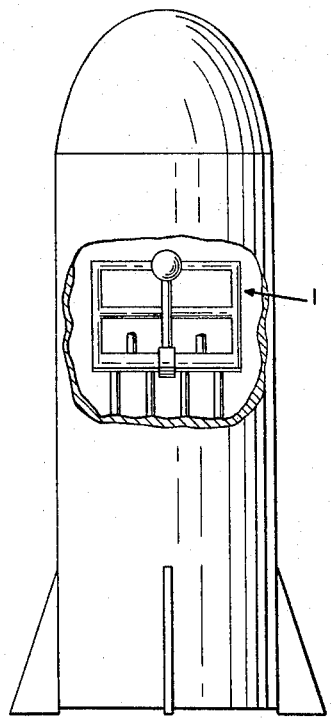
FIG. 3
Wilbur E. Grunwald,
INVENTOR.

3,263,505
PNEUMATIC ACCELEROMETER

Wilbur E. Grunwald, Huntsville, Ala., assignor to the United States of America as represented by the Secretary of the Army
Filed May 26, 1964, Ser. No. 370,381
10 Claims. (Cl. 73—515)

The invention described herein may be manufactured and used by or for the Government for governmental purposes without the payment of any royalty thereon.

The present invention relates to a device for sensing acceleration by movement of a free floating, force centered, valve spool which proportionately controls a fluid output in response to acceleration.

The important of providing an accurate and dependable accelerometer becomes greater as modern missiles improve in various aspects of their performance. The accelerometer serves several purposes within the typical missile system. To be acceptable for a missile system the accelerometer must be compact, extremely accurate, and dependable under conditions of serve forces and vibrations which the missile system will encounter during flight.

The present invention utilizes only one moving part which controls a flow of fluid to a pneumatic servo or control system. The device is extremely small, its size being dependent only upon available methods of fabrication. Further, the device is simple is design and lends itself to rugged construction.

It has long been a problem to provide and accelerometer which meets the stringent requirements of accuracy, simplicity, and ruggedness which are demanded of missile accelerometers. Further, to be effective for modern warfare the accelerometer must be capable of dependable operation in an environment of radiant energy.

Thus, the primary object of my invention is to provide an extremely dependable accelerometer having a single moving part.

Another object of my invention is to provide an accelerometer which is capable of maintaining accuracy under severe conditions of force and vibration.

A further object of my invention is to provide an accelerometer which is capable of dependable operation in an environment of radiant energy.

Yet another object of my invention is to provide an accelerometer which is extremely durable.

Still another object of my invention is to provide an accelerometer the output of which consists of a proportional flow of fluids.

A further object of my invention is to provide an accelerometer which uses pressurized fluid as its sole controlling output force.

Still another object of my invention is to provide an accelerometer which is sensitive to minor accelerations while yet capable of functioning accurately when subjected to extreme forces of acceleration.

Other features of my invention will become apparent in due course from the following description hereof with reference to the accompanying drawings given primarily by way of example and in which:

FIGURE 1 is a diagrammatic showing of the device, the valve portion and fluid conduits being illustrated in section for purposes of clarity;

FIGURE 2 is a sectional view taken on line 2—2 of FIGURE 1; and

FIGURE 3 is a typical missile partly cut away to illustrate the application of the accelerometer therein.

Referring now to FIGURE 1, an accelerometer assembly 1 embodies a valve body 2 which is provided with an inlet port 3, a pair of outlet ports 5 and 7, a pair of relief ports 9 and 11, and a pair of exhaust ports 15 and 16. The valve is arranged symmetrically in so far as the port locations are concerned. Within the valve body is located a control spool 17. To provide a centering means for the spool, balance pistons 19 and 21 are attached at either end thereof. Intermediate the balance pistons is located a control piston 23 which is attached to each balance piston by a pair of spool rods 25 and 27. Inlet port 3 is connected to a high pressure fluid supply 29 by a supply line 31. Fluid is also supplied to a pair of balance chambers 33 and 35, located in the end portions of the valve body, by a pair of balance lines 37 and 38. Each balance line is provided with a dropping orifice 41 and 42 for reducing the pressure between the fluid supply and the balance chambers. To provide damping between the balance chambers a damping line 43 serves to interconnect these chambers. A damping orfice 45 is located within the damping line to reduce lateral oscillation of control spool 17. To provide metered flow to each of the balance chambers metering orfices 47 and 49 are provided within exhaust ports 15 and 16 respectively and cooperate with balance pistons 19 and 21 to control the flow through each of the balance chambers.

In operation of the device it will first be assumed that a steady state condition exists in which the lateral acceleration force will be zero. Under these conditions control spool 17 will assume a centered position as illustrated in FIGURE 1. In this position control piston 23 completely closes inlet port 3 thus preventing any differential output through ports 5 or 7. Fluid is also supplied through balance lines 37 and 38, for flow through balance chambers 33 and 35. Pressure in the balance chambers will be less than the supply pressure since the fluid must pass through the dropping orfice located in each balance line. Balance pistons 19 and 21 partially close the rectangular metering orfices 47 and 49 thus restricting the flow through exhaust ports 15 and 16. It will be noted that while spool 17 is centered a slight opening exists between the innerface of the balance pistons and relief ports 9 and 11 so as to provide communication between ports 5 and 11 on one side of the valve body and between ports 7 and 9 on the opposite side of the valve body. Assuming an acceleration force would cause movement of control spool 17 toward balance chamber 35, it is apparent that metering orifice 49 would become smaller as balance piston 21 moves into chamber 35. At the same time balance piston 19 will have moved away from balance chamber 33, thus enlarging metering orifice 47 and decreasing the pressure in balance chamber 33. The decrease in pressure within balance chamber 33 coupled with the increased pressure in chamber 35 will combine to resist further spool movement. Thus, an excellent spool balancing system is provided which allows the spool to be affected by slight accelerations but will resist extreme spool movements. Damping line 43 which is restricted by orifice 45 provides a means for bleeding high pressure fluid from the balance chamber of highest pressure to the low pressure balance chamber, thus providing a damping effect which prevents excessive lateral oscillation of the control spool. Upon movement of the control spool toward chamber 35 it will be apparent that control piston 23 will allow fluid flow from inlet port 3 through outlet port 7. Relief port 9 would at this point be closed by the inner portion of balance piston 19. It will be apparent that the volume of fluid flow through output port 7 will vary directly with the lateral position of control piston 23. Thus, the output through ports 5 and 7 may be utilized for operation of a control system in the missile. It will be apparent that upon return of the spool to a neutral position the relief ports will again be open, thus relieving any pressure remaining in the output ports.

The device is particularly adaptable for providing a variety of operational characteristics by merely replacing the rectangular orifices 47 and 49 with orifices having a nonlinear configuration. Triangular shaped orifices, for example, would result in more or less sensitivity to extreme accelerations depending upon the location of the apex of the triangular orifices. This would allow for controlling the output for compensation of dynamic response in a nonlinear servo system.

While the foregoing is a description of the preferred embodiment the following claims are intended to include those variations and modifications that are within the spirit and scope of the invention.

I claim:

1. A pneumatic accelerometer comprising: a fluid supply means; a valve body having a balance chamber on each end thereof, a control section intermediate said balance chambers, an inlet port, a pair of output ports, a pair of relief ports and a pair of exhaust ports; a control spool positioned within said valve body for movement in either direction therethrough; a balance piston on each end of said control spool adjacent said balance chambers, said control spool having an output control piston intermediate said balance pistons and within said control section; fluid communication means connected between said fluid supply and each of said balance chambers; means providing fluid communication between said fluid supply and said control section via said inlet port; and fluid metering means connecting each of said balance chambers to one of said exhaust ports, said metering means operating in response to lateral movement of said balance pistons, said output control piston cooperating with said control section of the valve body to control passage of fluid from said inlet port to one of said output ports in proportion to the lateral position of said output control piston, each of said relief ports cooperating with one of said balance pistons to provide communication between one of said output ports and one of said relief ports when said output control piston terminates flow to said last mentioned output port.

2. A device as set forth in claim 1 wherein a pressure dropping orifice is formed between said fluid supply and each of said balance chambers within said first mentioned fluid communication means.

3. A device as set forth in claim 2 wherein a damping line provides fluid communication between said balance chambers.

4. A device as set forth in claim 3 wherein a damping orifice is provided within said damping line.

5. A pneumatic accelerometer comprising: a fluid pressure supply; valve means, said valve means having an inlet port, a pair of balance chambers, a pair of exhaust ports, a pair of relief ports, and a pair of output ports; means providing low pressure fluid communication between said fluid pressure supply and said balance chambers; means providing high pressure fluid communication between said fluid pressure supply and said valve inlet port, said valve means providing selective proportional fluid flow through said exhaust ports in response to acceleration forces whereby fluid flow through said balance chambers is metered to said exhaust ports so as to counteract actuation of said valve means, said valve means providing a proportional fluid flow from said inlet port to one of said output ports in response to said acceleration; and means to relieve the pressure within said output ports to said relief ports in response to termination of fluid flow to either of said output ports.

6. A device as set forth in claim 5 wherein said metering means comprises a pair of balance pistons cooperating with metering orifices within said valve means.

7. A device as set forth in claim 6 wherein said valve means further comprises a control piston rigidly interconnected intermediate said balance pistons for controlling said proportional flow to said output ports.

8. A device as set forth in claim 7 wherein said balance pistons cooperate with said relief ports to form said pressure relief means.

9. A device as set forth in claim 8 wherein a dropping orifice is formed between said fluid pressure supply and each of said balance chambers to provide said low pressure within said balance chambers.

10. A device as set forth in claim 9 wherein a restricted fluid communication means is provided between said balance chambers.

References Cited by the Examiner

UNITED STATES PATENTS

| 2,183,002 | 12/1939 | Bach | 73—515 |
| 3,190,127 | 6/1965 | Gwathmey | 73—515 |

RICHARD C. QUEISSER, *Primary Examiner.*

JAMES J. GILL, *Assistant Examiner.*